3,008,225
FRICTION COMPOSITION

Thomas A. Healy, Rocky River, Ohio, assignor to The S. K. Wellman Company, Bedford, Ohio, a corporation of Ohio
No Drawing. Filed Nov. 30, 1959, Ser. No. 855,980
4 Claims. (Cl. 29—182.5)

This invention relates to improvements in friction material for aircraft and land vehicular and for industrial use and has particular significance in connection with pressed and sintered predominantly metallic material useful as brake or clutch friction facing with large heat load capacity.

Friction materials, as used for linings or facings in brakes, clutches and automatic transmissions, must be selected and compounded with many factors in mind to assure satisfactory operation and customer acceptance. These factors include (1) ability to meet customers' specification as to so many normal energy stops, so many high energy stops, and/or one "panic" stop, (2) low wear of the lining and of the surface which it engages, (3) high co-efficient of friction requirement and requisite absence of "fading" and "decay" as hereafter defined, (4) low "torque peaking" as hereafter described, (5) quietness of operation of the material, (6) freedom from "grabbing" and chatter" and other erratic operation, and (7) low cost of the materials and of their compounding.

Particularly for large aircraft and for land vehicle brake applications, there has been a long search for a satisfactory friction material. Various formulations for predominantly metallic friction facings made from powders have been used for many years, but the facings heretofore known have not met all of the rigid requirements for a satisfactory friction material for many applications. In the higher energy applications (that is, the higher heat of operation applications) particularly, there have been problems of excessive torque peaking, excessive decay of co-efficient of friction, and excessive chatter.

It is an object of the present invention to provide simple and inexpensive means for overcoming the above mentioned difficulties.

Another object of the invention is to provide an improved friction lining material capable of satisfying the maximum number of long known requirements particularly under the most severe working conditions.

According to one aspect, the present invention meets these and other objects through the provision of a novel friction material consisting of a pressed and sintered mix of original finely divided iron powder, graphite, molybdenum disulfide, and molybdenum disilicide in certain desirable proportions as hereinafter set forth, presenting the advantages, e.g. over the best prior known mix of iron, graphite, and silicon carbide, of reducing torque peak ratio more than 50%, of decreasing average chatter nearly 75% and of decreasing coefficient decay more than 70%, without substantial decrease (and in fact with a small increase) of coefficient of friction. In another aspect, the invention concerns the use of iron, graphite and $MoSi_2$ alone, although thus far I have not found the results to be quite as good as when $MoSi_2$ is used with $MoS_2$ as dual additives.

Other objects and advantages will become apparent and the invention may be better understood from consideration of the following description.

More or less typical of a sintered predominantly metallic friction mix heretofore known and used is that described in U.S. Patent No. 2,899,740, issued August 18, 1959, and assigned to the assigned of the present invention, on an application filed by C. T. Cox, and which contains a metallic powder and two non-metallic powders. In that mix iron was used as the base material because of its stability during high temperature operation and because it contributes to low "fade," relatively coarse graphite was included perhaps because within certain limits it acts as both a lubricant and as a friction agent, and silicon carbide was used perhaps because it acts as a friction agent, and also as an abrasive or cleansing agent. According to the prevailing art such materials are powdered, then mixed in certain proportions, and then pressed and sintered.

By contrast, I have found that for some applications an improved friction composition may be made by substituting $MoSi_2$ alone, or preferably together with $MoS_2$, in place of the silicon carbide.

In the specification of the patent above refered to, the only specific example gave proportions of 80-10-10, but it was stated that exact percentages depend upon so many factors that the iron could vary from 60–90% and the other ingredients could also vary over wide limits.

In the accompanying table in columns 3 and 4, a base line is established from tests using a "best prior art" mix of 75% Fe, 15% Gr, and 10% SiC as shown by horizontal line 1 of the table. For the various mixes, that is for each of the horizontal lines of the table, the tests are made on an inertia dynamometer comprising a fixture having a rotating disc with friction material under test on both sides thereof and arranged to mate with stationary opposing discs of "Timken" 17–22A(s) steel. As is customary in the art, braking action is brought about by the forcing of the discs together, and the tests are run with a constant energy input, a flywheel being brought to a complete stop with each brake application. The brake fixture is held on a torque shaft which operates a torque arm against the restraint of an oil filled bellows and electrical apparatus is used to apply the brake at desired preset speeds and to release the brake when the flywheel has come to rest. Pressure recorders record brake hydraulic pressure used for each stop and supply torque curves for each stop, and a Sanborn recording oscillograph is used to record a deflection of a chatter torque arm. Coefficient of friction is calculated as torque at unit radius divided by total brake pressure.

The same number of fifty stops are used for each test except in cases where the tests could not be completed as noted in column 7 of the accompanying table.

Vertical column 8 of the table shows the torque peak ratio, where:

$$\text{Torque peak ratio} = \frac{\text{peak torque}}{\text{average torque for one stop}}$$

Column 9 shows chatter, which was obtained from the recording oscillograph.

Column 10 shows wear (in mils per face per stop) as determined from difference in micrometer readings before and after test.

Column 11 shows maximum average co-efficient of friction (per stop), column 12 shows minimum average co-efficient of friction (per stop) over 50 stops (if 50 could be completed without bond failure or some other disability), and column 13 shows the difference of these two values as co-efficient "Decay." Those in the art will recognize that "Decay" (which is the difference of max. and min. for many stops) is not the same as "Fade" (which is the decrease of co-efficient of friction from beginning to just before the end of one stop) but a change in the one may be reflected in a change in the other.

Column 14 shows average static (stopped condition) co-efficient of friction and column 15 shows the average dynamic co-efficient of friction, and for the vertical columns 9, 14 and 15, the values represent an average (for many stops) of averages one for each stop.

In the table, horizontal line 1 shows that for the base line (best prior art) mix there is a torque peak ratio of 3.9; average chatter of 170; and co-efficient of friction decay of .313. All of these values are too high and it is an object of the present invention to improve upon them.

By contrast, in the table, horizontal line 2 shows results for a preferred embodiment which is as follows (the percentage of the ingredients being by weight):

| | Percent |
|---|---|
| Iron | 70 |
| Graphite | 10 |
| Molybdenum disilicide | 15 |
| Molybdenum disulphide | 5 |

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Test No. | Percent Fe | Percent Gr | Percent SiC | Percent $MoSi_2$ | Percent $MoS_2$ | No. of stops Completed | Tq. Pk. Ratio | Average Chatter | Wear | Coef. Max. | Coef. Min. | Coef. Decay | Av. Stat. Coef. | Av. Dyn. Coef. |
| 1 | 75 | 15 | 10 | | | 50 | 3.9 | 170 | .203 | .380 | .067 | .313 | .505 | .201 |
| 8 | 70 | 10 | | 15 | 5 | 50 | 1.7 | 43 | .477 | .240 | .150 | .090 | .487 | .203 |
| 2 | 65 | 15 | | 10 | 10 | 50 | 1.9 | 108 | .443 | .285 | .148 | .137 | .398 | .193 |
| 3 | 70 | 15 | | 10 | 5 | 45 | 2.6 | 67 | 1.020 | .255 | .135 | .120 | .427 | .195 |
| 4 | 75 | 15 | | 10 | | 50 | 3.2 | 79 | .426 | .360 | .120 | .240 | .493 | .177 |
| 5 | 75 | 15 | | | 10 | 10 | 2.2 | 40 | 3.210 | .210 | .120 | .090 | .417 | .419 |
| 6 | 70 | 10 | | 10 | 10 | 50 | 2.0 | 73 | .255 | .250 | .140 | .110 | .386 | .187 |
| 7 | 65 | 10 | | 15 | 10 | 40 | 2.0 | 65 | .589 | .285 | .150 | .135 | .509 | .207 |
| 9 | 75 | 10 | | 10 | 5 | 50 | 2.7 | 29 | .376 | .215 | .125 | .090 | .459 | .163 |
| 12 | 75 | 5 | | 10 | 10 | 50 | 2.3 | 27 | .186 | .215 | .115 | .100 | .464 | .154 |
| 14 | 70 | | | 20 | 10 | 15 | 3.1 | 68 | built up | .150 | .105 | .045 | .588 | .119 |
| 19 | 80 | | | 20 | | 14 | 2.7 | 74 | 2.05 | .480 | .160 | .320 | | .301 |
| 20 | 65 | 15 | 5 | 5 | 10 | 50 | 1.9 | 53 | .176 | .300 | .160 | .140 | .521 | .195 |
| 21 | 65 | 10 | 5 | 10 | 10 | 50 | 1.9 | 43 | .196 | .290 | .135 | .155 | .538 | .116 |
| 22 | 75 | 10 | 5 | 10 | | 50 | 3.1 | 37 | .175 | .340 | .130 | .210 | .609 | .170 |
| 23 | 75 | 7 | 3 | 10 | 5 | 50 | 2.4 | 47 | built up | .315 | .120 | .195 | .479 | .155 |
| 24 | 70 | 10 | 2 | 13 | 5 | 50 | 2.0 | 53 | .147 | .315 | .120 | .195 | .515 | .203 |

Nature knows few critical limits and it is difficult to set limits for desirable ranges for the above, since exact proportions depend on particle size and even shape of the ingredients, on apparent density of the ingredients, on pressures used during compounding and during sintering, on sintering temperatures, ultimate application of the end product as regards engagement pressure, cooling of parts, nature of mating surface, size and shape of the friction material, and other factors.

However, and as supported by the table horizontal lines 3 et seq. where, for example, test 14 shows a torque peak ratio which is too high and an average dynamic co-efficient of friction which is too low, and test 21 shows a co-efficient of friction decay which is greater than desired, the following ranges (in weight percent) have been found suitable in many cases.

0 to 10 $MoS_2$  ⎫ But with these two additives totaling not
5 to 20 $MoSi_2$ ⎭ more than 25%.
5 to 15 graphite
Balance substantially all iron, or iron with SiC, or with another grit additional to the $MoSi_2$.

The use of $MoSi_2$ without the $MoS_2$ additive as shown by test 4 helped only the chatter, and even the addition of silicon carbide did not then materially help to bring up the average co-efficient of friction.

The high cost of $MoSi_2$ made its first use unobvious, but the use of $MoS_2$ without this $MoSi_2$ additive did not give useable results for the wear was too severe, see line for test No. 5.

But by using iron, graphite and $MoSi_2$ (with or without $MoS_2$) there is provided a composition of the character described capable of meeting the objects above set forth and providing desirable decreased decay without dropping a desirable high starting coefficient of friction, while at the same time improving chatter and lowering the torque peak ratio.

Sintered articles of the type referred to are produced by pressing or briquetting the powders, for example at a pressure on the order of 15 tons per square inch, then heating and meanwhile bonding as to a backing plate in a furnace under a pressure on the order of 300 pounds per square inch and at a temperature of 1800° F. all as stated in the above mentioned Pat. 2,899,740.

While I have illustrated and described particular embodiments, various modifications may obviously be made without departing from the true spirit and scope of the invention which is intended to be defined in the appended claims taken with all reasonable equivalents.

I claim:

1. A friction composition comprising a pressed and sintered mixture of about 10% by weight of graphite, about 15% of molybdenum disilicide, and the balance substantially all iron.

2. A friction composition consisting of a pressed and sintered mixture of about 70% iron, 10% graphite, 5% of molybdenum disulfide, and 15% of molybdenum disilicide, all by weight.

3. A friction composition comprising a pressed and sintered mixture predominantly iron and having 5 to 15% graphite, 5 to 20% molybdenum disilicide and up to 10% molybdenum disulfide but with the molybdenum compounds totaling not more than 25% of the mixture, all by weight.

4. An iron base pressed and sintered friction facing containing, by weight, 5 to 15% graphite and 5 to 20% $MoSi_2$.

References Cited in the file of this patent

UNITED STATES PATENTS

| | | |
|---|---|---|
| 2,408,430 | Lowey et al. | Oct. 1, 1946 |
| 2,783,529 | Huntress | Mar. 5, 1957 |
| 2,848,795 | Lowey | Aug. 26, 1958 |
| 2,863,211 | Wellman | Dec. 9, 1958 |
| 2,899,740 | Cox | Aug. 18, 1959 |

FOREIGN PATENTS

| | | |
|---|---|---|
| 716,604 | Great Britain | Oct. 13, 1954 |
| 807,776 | Great Britain | Jan. 21, 1959 |